United States Patent
Niranjan et al.

(10) Patent No.: US 8,203,971 B2
(45) Date of Patent: Jun. 19, 2012

(54) GROUP COMMUNICATION IN A MOBILE AD-HOC NETWORK

(75) Inventors: Niranjan, Garland, TX (US); Mohan Reddy Duggi, Basking Ridge, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 808 days.

(21) Appl. No.: 11/653,010

(22) Filed: Jan. 12, 2007

(65) Prior Publication Data

US 2008/0170513 A1 Jul. 17, 2008

(51) Int. Cl.
H04L 12/28 (2006.01)
H04L 12/56 (2006.01)
H04W 40/00 (2009.01)

(52) U.S. Cl. ........ 370/256; 370/254; 370/408; 370/390; 455/445

(58) Field of Classification Search .................. 370/254, 370/351, 256, 352, 390, 389, 408; 455/445
See application file for complete search history.

(56) References Cited

U.S. PATENT DOCUMENTS

| | | | | |
|---|---|---|---|---|
| 5,327,127 A | * | 7/1994 | May et al. | 341/102 |
| 5,987,011 A | * | 11/1999 | Toh | 370/331 |
| 6,449,667 B1 | * | 9/2002 | Ganmukhi et al. | 710/28 |
| 6,628,620 B1 | * | 9/2003 | Cain | 370/248 |
| 6,836,463 B2 | * | 12/2004 | Garcia-Luna-Aceves et al. | 370/238 |
| 6,917,985 B2 | * | 7/2005 | Madruga et al. | 709/238 |
| 7,159,035 B2 | * | 1/2007 | Garcia-Luna-Aceves et al. | 709/241 |
| 7,349,370 B2 | * | 3/2008 | Lee et al. | 370/328 |
| 7,664,032 B2 | * | 2/2010 | Nakamura et al. | 370/235 |
| 2002/0042274 A1 | * | 4/2002 | Ades | 455/445 |
| 2003/0227934 A1 | * | 12/2003 | White et al. | 370/432 |
| 2004/0014467 A1 | * | 1/2004 | O'Neill et al. | 455/422.1 |
| 2004/0048618 A1 | * | 3/2004 | O'neill et al. | 455/445 |
| 2004/0172421 A1 | * | 9/2004 | Saito et al. | 707/200 |
| 2004/0218582 A1 | * | 11/2004 | Kennedy et al. | 370/351 |
| 2005/0141706 A1 | * | 6/2005 | Regli et al. | 380/44 |
| 2005/0180447 A1 | * | 8/2005 | Lim et al. | 370/432 |
| 2005/0185632 A1 | * | 8/2005 | Draves et al. | 370/351 |
| 2006/0126514 A1 | * | 6/2006 | Lee et al. | 370/238 |
| 2006/0143009 A1 | * | 6/2006 | Jost et al. | 704/254 |
| 2006/0250999 A1 | * | 11/2006 | Zeng et al. | 370/312 |
| 2007/0086358 A1 | * | 4/2007 | Thubert et al. | 370/254 |
| 2007/0153764 A1 | * | 7/2007 | Thubert et al. | 370/351 |
| 2007/0280174 A1 | * | 12/2007 | Pun | 370/338 |

* cited by examiner

Primary Examiner — Marivelisse Santiago Cordero
Assistant Examiner — Mong-Thuy Tran

(57) ABSTRACT

A system, method, and computer readable medium for group communication protocol in mobile ad-hoc network, that comprises, collecting a route from a source node to at least one group member node, caching the collected route information, and merging an intermediate link of a host node having a single branch to the at least one group member node in the collected route.

25 Claims, 8 Drawing Sheets

GROUP COMMUNICATION IN A MOBILE AD-HOC NETWORK

CROSS REFERENCE TO RELATED APPLICATIONS

The present patent application is also related to commonly assigned U.S. Provisional Patent Application Ser. No. 60/497,271 filed on Aug. 22, 2003 entitled TRANSPARENT LAYER 2 ROUTING FOR MANET, and U.S. Provisional Patent Application Ser. No. 60/497,274, filed on Aug. 22, 2003 entitled COLLECTION OF ACTIVE ROUTE TOPOLOGY IN AODV PROTOCOL, the entire contents of each of which are incorporated by reference herein.

FIELD OF THE INVENTION

The present invention is generally related to wireless networks and more specifically to group communication in mobile ad-hoc networks by the utilization of Mobile Ad-hoc network Routing Protocol (MARP).

BACKGROUND OF THE INVENTION

Wireless networks follow one of two basic structures, fixed router based in which a backbone of fixed routers communicates with wireless nodes, and mobile router based in which the routers themselves are a part of the wireless node and form a self-configuring network of wireless links. In the mobile router based system, the routers are free to randomly move, leave and enter the system. Therefore, the mobile router based system links can change rapidly in both number and relative position. The links connecting nodes in a network is called a topology of the network. In an infrastructure-based system, a source wireless node communicates via a wireless link with a fixed router which in turn communicates within the infrastructure and further communicates via another wireless link to a destination wireless node. The source and destination wireless nodes communicate primarily through the fixed network topology. A mobile ad-hoc network (MANET) communicates primarily between wireless nodes, without a need for fixed routers. The topology of the MANET is self-configuring with the nodes themselves providing the routing function. The MANET does not require connection to a fixed router, but may be connected to a number of wireless networks (such as a cellular network) or to a number of data networks (such as the Internet).

There are a number of transmission protocols including unicasting, broadcasting and multicasting. Unicasting involves the sending of data from one source to one destination node, broadcasting involves the sending of data from one source to all destination nodes, and multicasting involves the simultaneous or near-simultaneous transmission of data from one source to many destination nodes or from many sources to many destination nodes. The difference between broadcasting and multicasting is that with broadcasting, data is sent to all connected nodes while with multicasting, the data is sent to only a selected subset of all of the connected nodes. Unicasting requires that the source copy an individual data packet for each destination node allowing redundant copies of the same transmission to be sent on a link. Broadcasting a copy of the data to each node resulting in the data packet being sent along every link regardless of whether the data packet will be used at each node. Both unicasting and broadcasting protocols result in redundant or unneeded transport of data packets. Conversely, multicasting transmissions copy a data packet as close to the destination as possible, and only send the packet to addresses that are part of a multicast group. As such, bandwidth is conserved by an elimination of data transmission redundancy and unneeded transport. This aspect of multicasting is critically important in MANETs, which have limited bandwidth.

Unicasting primarily utilizes a transmission protocol referred to as Transmission Control Protocol (TCP), whereas multicasting primarily utilizes a protocol referred to as User Datagram Protocols (UDP). There are several differences between the two protocols, but a main difference stems from a guarantee of delivery whereby TCP sends a receipt acknowledgement and UDP does not.

MANETs are mobile networks that have nodes, including host nodes, that join and leave the system dynamically. It is not possible to centrally administer multicast addresses in such networks as it would be in a fixed router based system. Therefore, in such a scenario, a MANET would be required to administer itself.

In prior art, group communication occurs through each branch of the communications tree, this communication protocol utilizes additional overhead. Therefore what is needed is a method of transmitting data with the high reliability of unicasting from a source to a list of known multiple destinations that does not require duplication of transmission resources or additional overhead associated with addressing.

SUMMARY OF THE INVENTION

Network communication is primarily based on a model referred to as Open System Interconnection (OSI), which has seven layers of functions, with each layer using only the functions of the layers below and exporting functions only to the layer above. The seven layers are the physical layer, the data link layer, the network layer, the transport layer, the session layer, the presentation layer and the application layer. Computational overhead increases with each successive layer. The layers that are most directly related to this invention are the data link layer (layer 2) and the network layer (layer 3). The data link layer provides an ability to transfer data between network nodes and the addressing in the data link layer is physical and is referred to as Media Access Control (MAC). The network layer provides a function of transferring variable length data sequences between a source node and a destination node and provides network routing, flow control and segmentation and de-segmentation of the data.

The MARP runs between the data link layer (hereinafter also referred to as the MAC layer or layer 2) and the network layer (hereinafter also referred to as the IP layer or layer 3). Data packets sent from the network layer to the data link layer are considered outbound. Data packets sent from the data link layer to the network layer are considered inbound. Inbound and outbound data packets are routed through a MANET Routing Protocol (MARP) layer. The MARP layer, which is positioned between the MAC layer and the IP layer, constructs a routing table containing MAC addresses. Each data packet contains a Media Access Control header.

Outbound data packets have their destination MAC address read by the MARP layer. A routing table utilizes the MAC address as a key. The routing table is searched for a destination MAC address and if the address is found, the data packet is sent to the next hop. If the destination MAC address is not located in the routing table, a route discovery is performed. Route discovery consists of sending a flooding packet appended to the data packet and broadcasting the resulting message to the entire MANET.

Inbound data packets have their destination MAC address read by a media address resolution protocol module. If the inbound data packet contains a flooding packet, the data packet is rebroadcast and one copy is sent to the network layer. If the destination address matches the MAC address of the node, the data packet is sent to the network layer. If the destination MAC address is in the routing table, the packet is sent to the next hop.

The first time a data packet is sent to a destination node, a broadcast route request message is sent to the entire MANET and a unicast route response message is returned from the destination node. Each node receiving the route request message caches the node that the request came from to construct a route back to the originator of the request. This allows the route reply to be unicast back from the destination along the cached path back to the originator. During the route reply, each of the nodes along the path caches the node that returned the reply so that a bi-directional route is established between the nodes.

A functional impasse is being approached between the capabilities of mobile ad-hoc networks in which each node acts as a router and in which low cost and low power consumption for many mobile devices necessitates lowered computational capabilities and multicasting that require increased bandwidth and computation resources. The present invention addresses this impasse by providing group communication in mobile ad-hoc networks in which data is specifically sent to specific nodes and wherein data transmission is not duplicated and addressing overhead is not increased which conserves MANET bandwidth. This group communication using MARP source routing in the MANET reduces broadcast problems that can occur when a transmission is sent through the MANET to a group, thus reducing the bandwidth requirement and the computation requirement for nodes comprising the MANET and also gaining the reliability inherent in unicasting protocols.

In group communication, the list of senders and receivers are known, in the present invention a group communication protocol utilizes the source routing feature of the MARP. The present invention takes advantage of the existing unicast routing protocols and thus adds no new overhead for a new protocol for group communication. Another advantage of the present invention is that it is based upon unicast data packets, which provide high reliability.

The present invention consists of three parts, group tree formation, encoding of the group communication tree and group communication. Group tree formation consists of the sender in the group collecting route information for each group member using MARP source routing. This information can be cached when the group is formed or it can be discovered using the MARP. Based on the route information to each group member, the sender forms the group communication tree. In the group communication tree all node links are merged, with the exception of, nodes having a degree greater than 2, and group member nodes. The merged links are then removed from the tree. Therefore in a group consisting of n members, all of which are receivers, the maximum number of nodes in the communication tree will be 2n−1.

The encoding of the group communication tree utilizes a method referred to as Neville's third encoding, from E. H. Neville, The codifying of tree structure, Proceedings of Cambridge Philosophical Society, 49:381-385, 1953. In this encoding the leaf node with the smallest label is deleted and its neighbor is recorded. If this results in the neighbor becoming a leaf in the sub-tree, it is deleted next and its neighbor is recorded. Otherwise the leaf with the smallest label is deleted and its neighbor recorded. This process is repeated until one node remains. If x bytes are required to represent each node member, the maximum size of the encoded group communication tree with n members will be (2n−1)*x bytes.

Algorithm to compute Neville's code (y) of the labeled tree:

```
x[1] = least node with degree 1
for 1 from 1 to n−1
    y[i] = parent of x[i]
    delete edge between x[i] and y[i]
    if (degree[y[i]] = 1 ˆy[i] not equal n)
        x[i+1] = y[i]
    else
        x[i+1] = least node with degree 1
Output y as the Neville's code
```

Algorithm to compute labeled tree from Neville's code:

```
j = least node with degree 1
for 1 from 1 to n−1
    parent[j] = code[i]
    degree[j] − −
    degree[code[i]]− −
    if (degree[code [i]] = 1) then
        j = code[i]
    else
        j = least degree node with degree 1
```

In group communication the group sender node computes the encoded sub-tree for each of its child nodes in the group communication tree and sends a unicast data packet containing the encoded sub-tree rooted in the child node. The child node recalculates the encoding for its sub-tree and attaches the encoded sub-tree information with the unicast data packet. The path maintenance due to node mobility or link failure is handled by the MANET ad-hoc routing protocol, MARP.

The systems, methods, and computer readable media of the present invention provide a group communications approach within a MANET whereby the MARP source routing protocols are utilized.

In one embodiment of the present invention, a method using a group communication in a mobile ad-hoc network, comprises, collecting a route from a source node to at least one group member node, caching the collected route information, and merging an intermediate link of a host node having a single branch to the at least one group member node in the collected route.

In another embodiment of the present invention, a method using a group communication in a mobile ad-hoc network, comprises, collecting a route from a source node to at least one group member node, caching the collected route information, merging an intermediate link of a host node having a single branch to the at least one group member node in the collected route, encoding a group communication route from the source node to the at least one group member node, attaching the encoded group communication route to a data packet, and sending the attached encoded group communication route and data packet from the source node to the at least one group member node.

In a further embodiment, a computer readable medium comprises instructions for, forming a group comprised of at least one group member node, collecting a route from a source node to the at least one group member node, determining a number of branches from a host node to the at least one group member node, merging an intermediate link of the host node having one branch to the at least one group member node in the collected route, and creating a consolidated route from the source node through the merged intermediate links to the at least one group member node.

In yet a further embodiment, a system for group communication protocol in mobile ad-hoc network, comprises, a transceiver for receiving and transmitting wireless data packets, a processor communicably coupled to the transceiver, wherein the processor encodes a group communication route from a source node to at least one group member node, attaches the encoded group communication route to a data packet and sends the attached encoded group communication route and data packet from the source node to at least one group communication node, and a memory communicably coupled to the processor, wherein the memory stores the at least one group communication node.

DETAILED DESCRIPTION OF THE INVENTION

Figure 1:
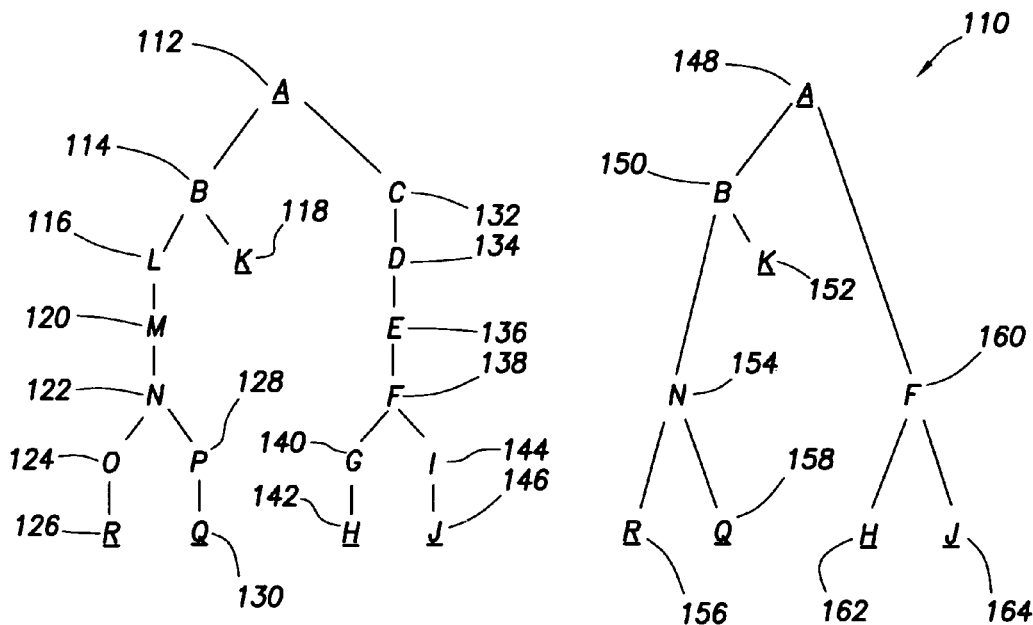
FIG. 1 depicts a communication tree before and after pruning of the mobile ad-hoc network in accordance with an embodiment of the present invention.

Referring now to FIG. 1, a mobile router diagram of the mobile ad-hoc network 110 is depicted and comprises a number of blocks or modules that are software, hardware, firmware, and/or the combination of software, hardware, and/or firmware. The present example is a tree layout, the group tree consists of communication points A 112, B 114, L 116, K 118, M 120, N 122, O 124, R 126, P 128, Q 130. The tree bifurcates at A, B N and F. The communication tree of the present invention consists of A 148, B 150, K 152, N 154, R 156, Q 158, F 160, H 162 and J 164. The intermediate points have been condensed into one link to reduce overhead and simplify routing. The communications tree of the present invention still bifurcates at A, B N and F.

Figure 2:
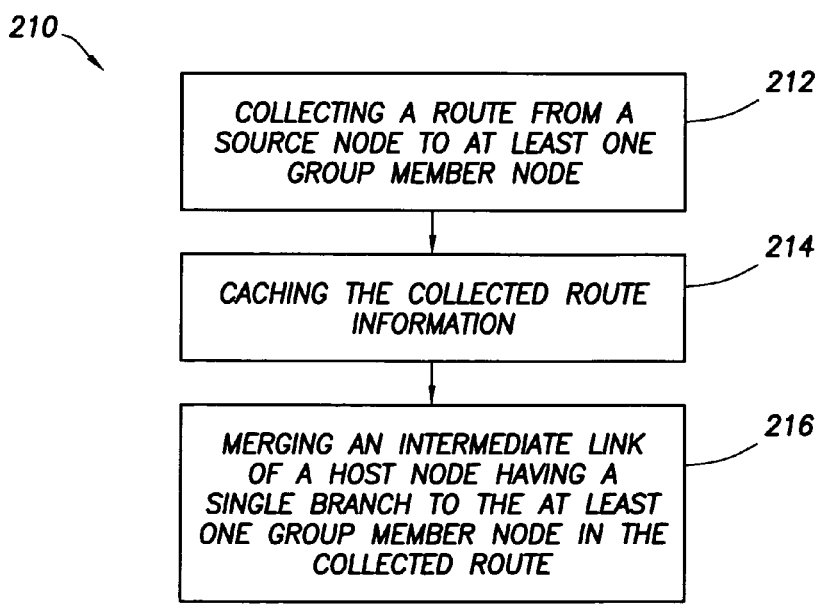
FIG. 2 depicts a first method of group communication protocol in mobile ad-hoc network in accordance with an embodiment of the present invention.

Referring now to FIG. 2, a first method 210 of group communication protocol in mobile ad-hoc network is depicted. The first method comprises, collecting 212 a route from a source node to at least one group member node, caching 214 the collected route information, and merging 216 an intermediate link of a host node having a single branch to the at least one group member node in the collected route. The method is performed by software, hardware, firmware, and/or the combination of software, hardware, and/or firmware.

Figure 3:
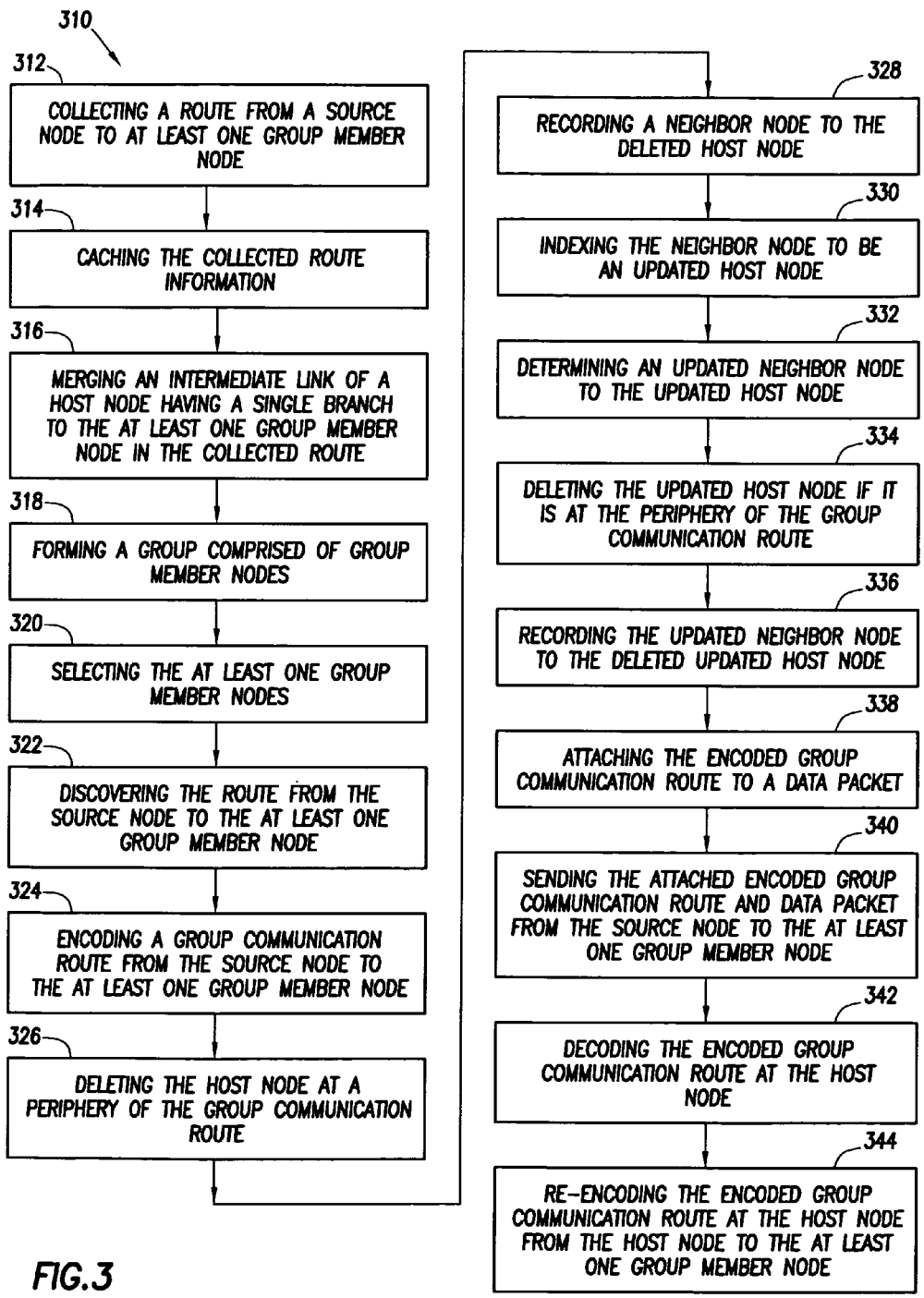
FIG. 3 depicts a second method of group communication protocol in mobile ad-hoc network in accordance with an embodiment of the present invention.

Referring now to FIG. 3, a second method 310 of group communication protocol in mobile ad-hoc network is depicted. The second method comprises, collecting 312 a route from a source node to at least one group member node, caching 314 the collected route information, and merging 316 an intermediate link of a host node having a single branch to the at least one group member node in the collected route. The method may also comprise forming 318 a group comprised of group member nodes, selecting 320 the at least one group member nodes and discovering 322 the route from the source node to the at least one group member node. The method may also comprise encoding 324 a group communication route from the source node to the at least one group member node where the encoding includes, deleting 326 the host node at a periphery of the group communication route, recording 328 a neighbor node to the deleted host node, indexing 330 the neighbor node to be an updated host node, determining 332 an updated neighbor node to the updated host node, deleting 334 the updated host node if it is at the periphery of the group communication route, and recording 336 the updated neighbor node to the deleted updated host node. The method may additionally comprise attaching 338 the encoded group communication route to a data packet, sending 340 the attached encoded group communication route and data packet from the source node to the at least one group member node, decoding 342 the encoded group communication route at the host node and re-encoding 344 the encoded group communication route at the host node from the host node to the at least one group member node. The method is performed by software, hardware, firmware, and/or the combination of software, hardware, and/or firmware.

Figure 4:
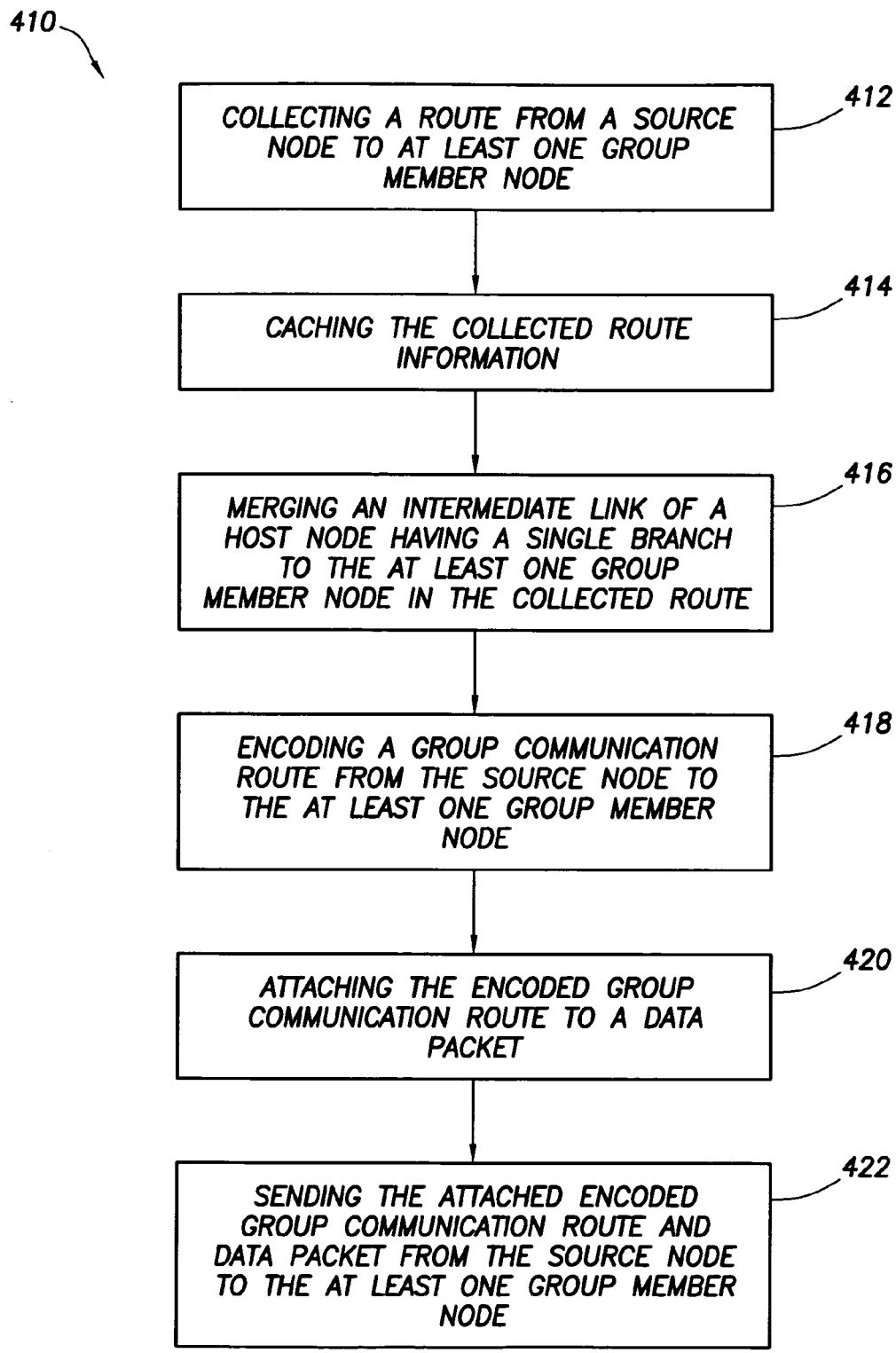
FIG. 4 depicts a first method of group communication protocol in mobile ad-hoc network in accordance with an embodiment of the present invention.

Referring now to FIG. 4, a third method 410 of group communication protocol in mobile ad-hoc network is depicted. The third method comprises, collecting 412 a route from a source node to at least one group member node, caching 414 the collected route information, merging 416 an intermediate link of a host node having a single branch to the at least one group member node in the collected route, encoding 418 a group communication route from the source node to the at least one group member node, attaching 420 the encoded group communication route to a data packet, and sending 422 the attached encoded group communication route and data packet from the source node to the at least one group member node. The method is performed by software, hardware, firmware, and/or the combination of software, hardware, and/or firmware.

Figure 5:
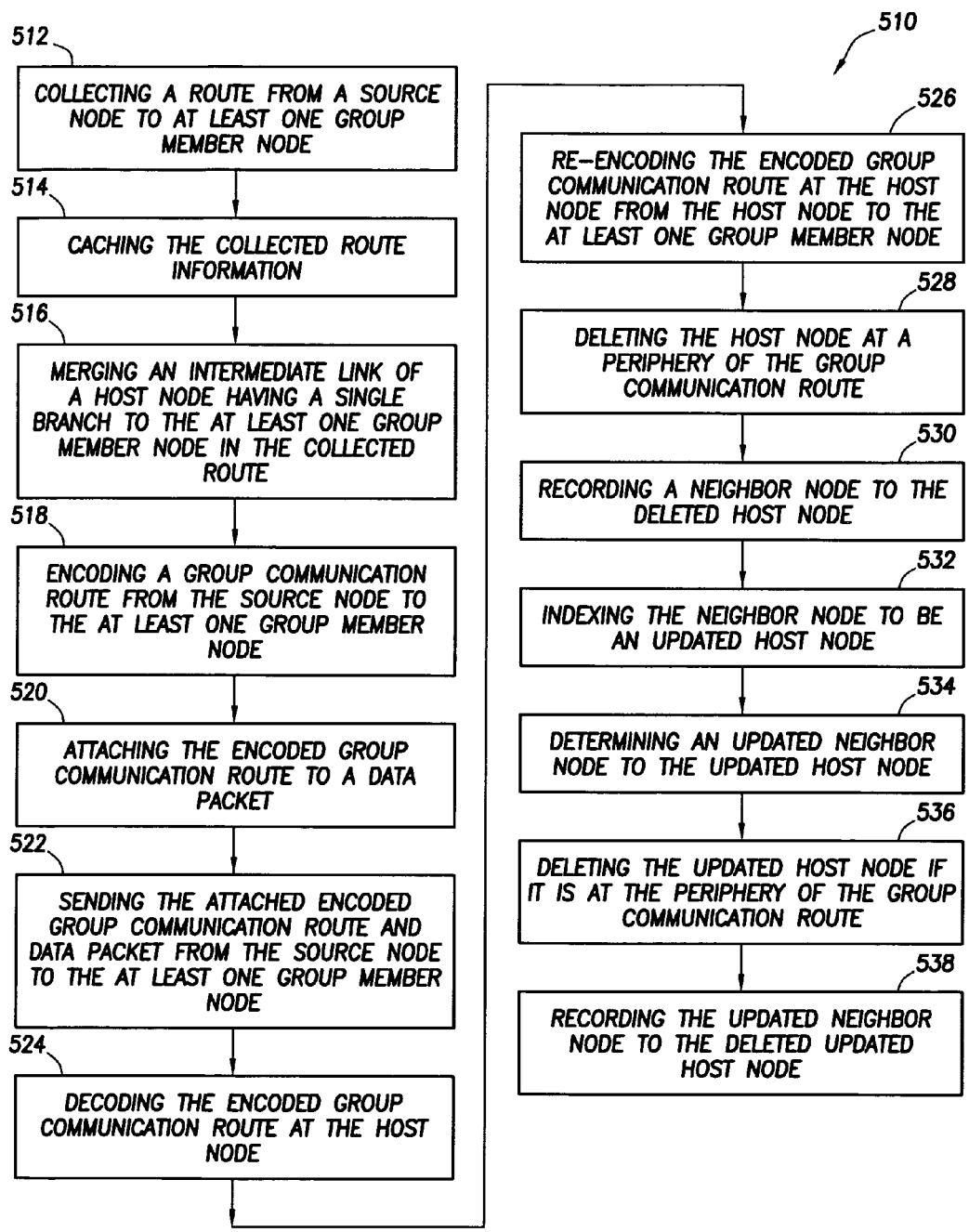
FIG. 5 depicts a second method of group communication protocol in mobile ad-hoc network in accordance with an embodiment of the present invention.

Referring now to FIG. 5, a fourth method 510 of group communication protocol in mobile ad-hoc network is depicted. The fourth method comprises, collecting 512 a route from a source node to at least one group member node, caching 514 the collected route information, merging 516 an intermediate link of a host node having a single branch to the at least one group member node in the collected route, encoding 518 a group communication route from the source node to the at least one group member node, attaching 520 the encoded group communication route to a data packet, and sending 522 the attached encoded group communication route and data packet from the source node to the at least one group member node. The method may also comprise decoding 524 the encoded group communication route at the host node, re-encoding 526 the encoded group communication route at the host node from the host node to the at least one group member node, deleting 528 the host node at a periphery of the group communication route, and recording 530 a neighbor node to the deleted host node. The method may additionally comprise indexing 532 the neighbor node to be an updated host node, determining 534 an updated neighbor node to the updated host node, deleting 536 the updated host node if it is at the periphery of the group communication route and recording 538 the updated neighbor node to the deleted updated host node. The method is performed by software, hardware, firmware, and/or the combination of software, hardware, and/or firmware.

Figure 6:
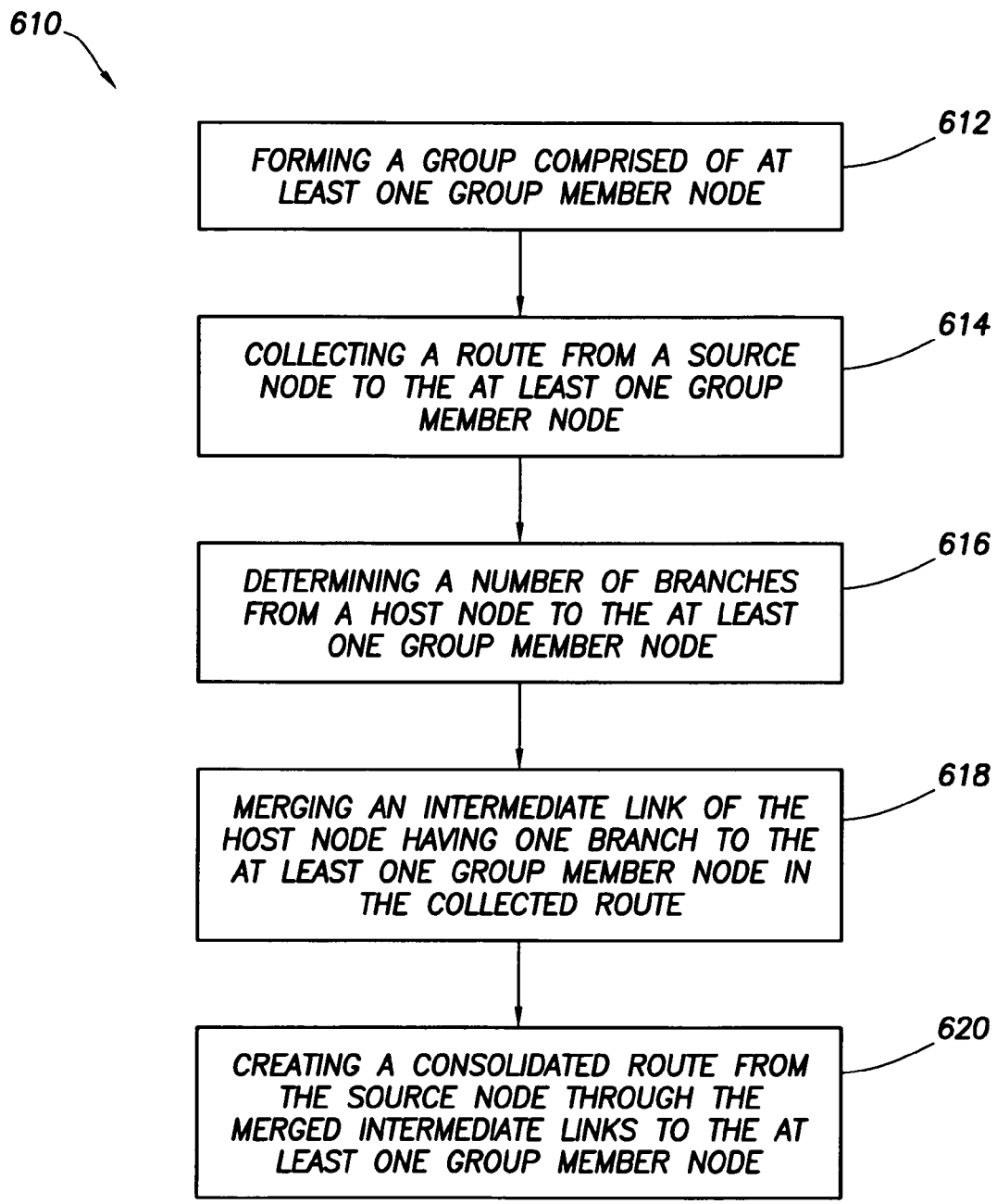
FIG. 6 depicts a first software flow diagram of group communication protocol in mobile ad-hoc network in accordance with an embodiment of the present invention.

Referring now to FIG. 6, a first software flow block 610 of group communication protocol in mobile ad-hoc network is depicted. The computer readable medium comprises instructions for, forming 612 a group comprised of at least one group member node, collecting 614 a route from a source node to the at least one group member node, determining 616 a number of branches from a host node to the at least one group member node, merging 618 an intermediate link of the host node having one branch to the at least one group member node in the collected route, and creating 620 a consolidated route from the source node through the merged intermediate links to the at least one group member node. These steps are preferably embodied in a computer readable medium or software but may also be embodied in firmware and are utilized via hardware. The transfer of information occurs via at least one of a wireless protocol, a wired protocol and the combination of the wireless protocol and the wired protocol. The steps performed in this figure are performed by software, hardware, firmware, and/or the combination of software, hardware, and/or firmware.

Figure 7:
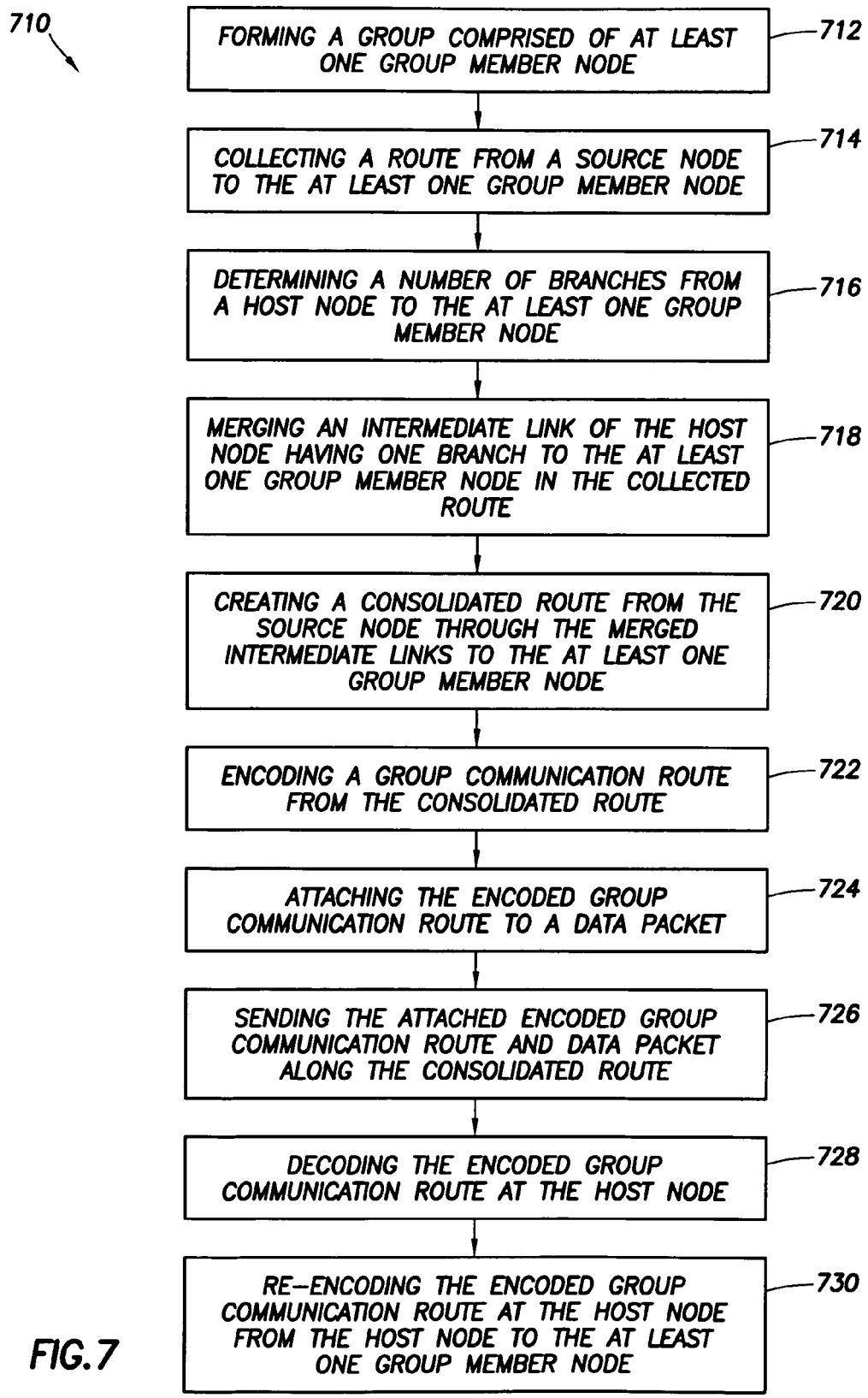
FIG. 7 depicts a second software flow diagram of group communication protocol in mobile ad-hoc network in accordance with an embodiment of the present invention.

Referring now to FIG. 7, a second software flow block 710 of group communication protocol in mobile ad-hoc network is depicted. The computer readable medium comprises instructions for, forming 712 a group comprised of at least one group member node, collecting 714 a route from a source node to the at least one group member node, determining 716 a number of branches from a host node to the at least one group member node, merging 718 an intermediate link of the host node having one branch to the at least one group member node in the collected route, and creating 720 a consolidated route from the source node through the merged intermediate links to the at least one group member node. The computer readable medium may also comprise encoding 722 a group communication route from the consolidated route, attaching 724 the encoded group communication route to a data packet, sending 726 the attached encoded group communication route and data packet along the consolidated route, decoding 728 the encoded group communication route at the host node and re-encoding 730 the encoded group communication route at the host node from the host node to the at least one group member node. These steps are preferably embodied in a computer readable medium or software but may also be embodied in firmware and are utilized via hardware. The transfer of information occurs via at least one of a wireless protocol, a wired protocol and the combination of the wireless protocol and the wired protocol. The steps performed in this figure are performed by software, hardware, firmware, and/or the combination of software, hardware, and/or firmware.

Figure 8:
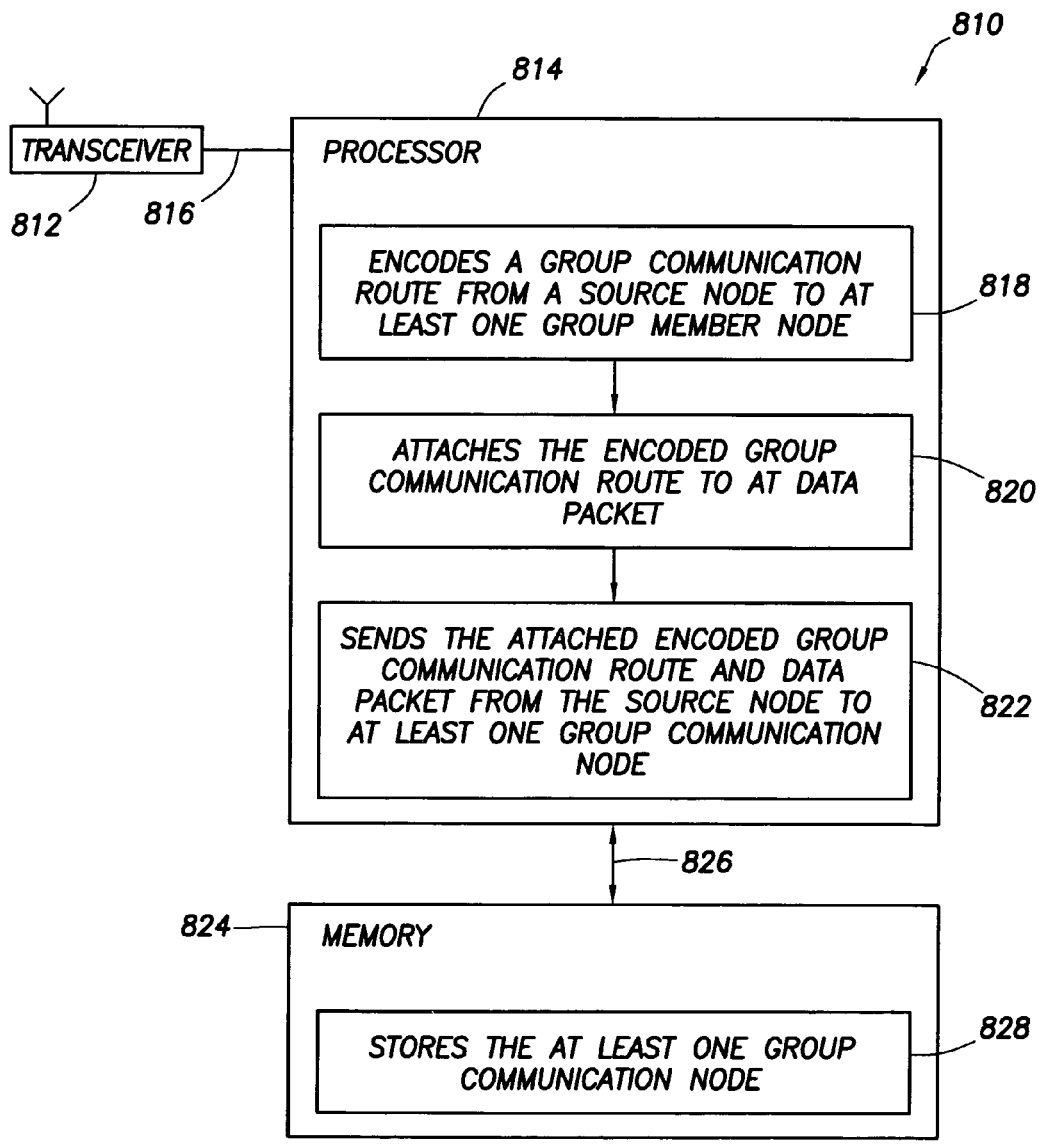
FIG. 8 depicts a first system of group communication protocol in mobile ad-hoc network in accordance with an embodiment of the present invention.

Referring now to FIG. 8, a first system 810 of group communication protocol in mobile ad-hoc network is depicted. The system comprises, a transceiver 812 for receiving and transmitting wireless data packets, a processor 814 communicably coupled 816 to the transceiver, wherein the processor encodes 818 a group communication route from a source node to at least one group member node, attaches 820 the encoded group communication route to a data packet and sends 822 the attached encoded group communication route and data packet from the source node to at least one group communication node, and a memory 824 communicably coupled 826 to the processor, wherein the memory stores the at least one group communication node 828. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor, transceiver and memory herein form a circuit.

Figure 9:
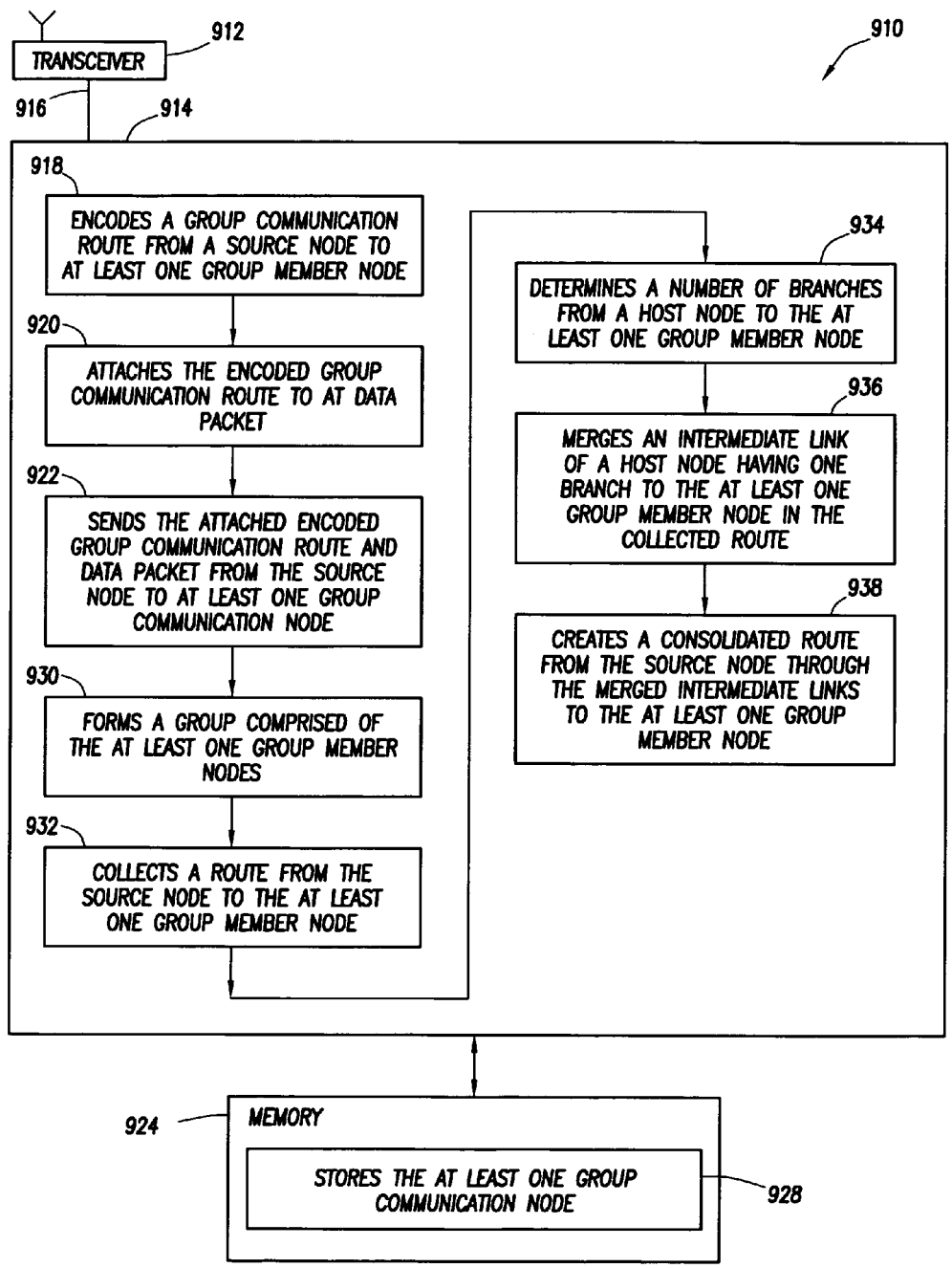
FIG. 9 depicts a second system of group communication protocol in mobile ad-hoc network in accordance with an embodiment of the present invention.

Referring now to FIG. 9, a second system 910 of group communication protocol in mobile ad-hoc network is depicted. The system comprises, a transceiver 912 for receiving and transmitting wireless data packets, a processor 914 communicably coupled 916 to the transceiver, wherein the processor encodes 918 a group communication route from a source node to at least one group member node, attaches 920 the encoded group communication route to a data packet and sends 922 the attached encoded group communication route and data packet from the source node to at least one group communication node, and a memory 924 communicably coupled 926 to the processor, wherein the memory stores the at least one group communication node 928. The processor may also form 930 a group comprised of the at least one group member nodes, collect 932 a route from the source node to the at least one group member node, determine 934 a number of branches from a host node to the at least one group member node, determine 936 a number of branches from a host node to the at least one group member node, merges 938 an intermediate link of a host node having one branch to the at least one group member node in the collected route and creating 940 a consolidated route from the source node through the merged intermediate links to the at least one group member node. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware. Additionally, the processor, transceiver and memory herein form a circuit.

Although an exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. This invention may be additionally utilized with Wireless Fidelity (WiFi), ZigBee which is a predominant home automation protocol, and motes, where the wireless transceiver is also a remote sensor, based MANETs.

What is claimed is:

1. A method of group communication in a mobile ad-hoc network, the method comprising:
   collecting a route from a source node to at least one group member node;
   caching the collected route information by encoding a group communication route from the source node to the at least one group member node;
   determining whether an intermediate link of a host node has a single branch to the at least one group member node in the collected route information;
   if the intermediate link has the single branch, merging the intermediate link by:
   deleting the host node having the single branch to the at least one group member node; and
   recording a neighbor node in place of the deleted host node.

2. The method of claim 1 further comprising:
   forming a group comprised of group member nodes.

3. The method of claim 1 further comprising:
   selecting the at least one group member node.

4. The method of claim 1 further comprising:
   discovering the route from the source node to the at least one group member node.

5. The method of claim 1, wherein the encoding further includes:
   indexing the neighbor node to be an updated host node;
   determining an updated neighbor node to the updated host node;
   deleting the updated host node if the updated host node is at the periphery of the group communication route; and
   recording the updated neighbor node to the deleted updated host node.

6. The method of claim 1 further comprising:
   attaching the encoded group communication route to a data packet.

7. The method of claim 6 further comprising:
   sending the attached encoded group communication route and data packet from the source node to the at least one group member node.

8. The method of claim 1 further comprising:
   decoding the encoded group communication route at the host node.

9. The method of claim 1 further comprising:
   re-encoding the encoded group communication route at the host node from the host node to the at least one group member node.

10. A method of group communication in a mobile ad-hoc network, the method comprising:
    collecting a route from a source node to at least one group member node;
    caching the collected route information;
    determining whether an intermediate link of a host node has a single branch to the at least one group member node in the collected route information;
    if the intermediate link has the single branch, merging the intermediate link by:
    deleting the host node having the single branch to the at least one group member node; and
    recording a neighbor node in place of the deleted host node;
    encoding a group communication route from the source node to the at least one group member node;
    attaching the encoded group communication route to a data packet; and
    sending the attached encoded group communication route and data packet from the source node to the at least one group member node.

11. The method of claim 10 further comprising:
    decoding the encoded group communication route at the host node.

12. The method of claim 10 further comprising:
    re-encoding the encoded group communication route at the host node from the host node to the at least one group member node.

13. The method of claim 10 wherein the encoding includes:
    deleting the host node at a periphery of the group communication route; and
    recording a neighbor node to the deleted host node.

14. The method of claim 13 wherein the encoding further includes:
    indexing the neighbor node to be an updated host node;
    determining an updated neighbor node to the updated host node;
    deleting the updated host node if the updated host node is at the periphery of the group communication route; and
    recording the updated neighbor node to the deleted updated host node.

15. A non-transient computer readable medium embodying a computer program, the computer program comprising:
    computer readable program code for forming a group comprised of at least one group member node;
    computer readable program code for collecting a route from a source node to the at least one group member node;
    computer readable program code for determining a number of branches from a host node to the at least one group member node;
    computer readable program code for determining whether an intermediate link of a host node has a single branch to the at least one group member node in the collected route;
    computer readable program code for, if the intermediate link has the single branch, merging the intermediate link by:
    deleting the host node having the single branch to the at least one group member node; and
    recording a neighbor node in place of the deleted host node; and
    computer readable program code for creating a consolidated route from the source node through the merged intermediate links to the at least one group member node.

16. The non-transient computer readable medium of claim 15, wherein the computer program further comprises:
    computer readable program code for encoding a group communication route from the consolidated route.

17. The non-transient computer readable medium of claim 16, wherein the computer program further comprises:
    computer readable program code for attaching the encoded group communication route to a data packet.

18. The non-transient computer readable medium of claim 17, wherein the computer program further comprises:
    computer readable program code for sending the attached encoded group communication route and data packet along the consolidated route.

19. The non-transient computer readable medium of claim 16, wherein the computer program further comprises:
    computer readable program code for decoding the encoded group communication route at the host node.

20. The non-transient computer readable medium of claim 19, wherein the computer program further comprises:

computer readable program code for re-encoding the encoded group communication route at the host node from the host node to the at least one group member node.

21. A system for group communication protocol in mobile ad-hoc network, the system comprising:
   a transceiver configured to receive and transmit wireless data packets;
   a processor communicably coupled to the transceiver, wherein the processor is configured to encode a group communication route from a source node to at least one group member node by
   determining whether an intermediate link of a host node has a single branch to the at least one group member node in the collected route, if the intermediate link has the single branch, merging the intermediate link by deleting the host node having the single branch to the at least one group member node, and recording a neighbor node in place of the deleted host node, attach the encoded group communication route to a data packet and send the attached encoded group communication route and data packet from the source node to at least one group communication node; and
   a memory communicably coupled to the processor, wherein the memory is configured to store the at least one group communication node.

22. The system of claim 21 wherein the-processor is further configured to form a group comprised of the at least one group member nodes.

23. The system of claim 21 wherein the-processor is further configured to collect a route from the source node to the at least one group member node.

24. The system of claim 21 wherein the processor is further configured to determine a number of branches from a host node to the at least one group member node.

25. The system of claim 21 wherein the processor is further configured to create a consolidated route from the source node through the merged intermediate links to the at least one group member node.

* * * * *